R. B. HEAD.
SIGHTING DEVICE FOR AEROPLANES.
APPLICATION FILED JUNE 19, 1918.
1,311,277.
Patented July 29, 1919.
4 SHEETS—SHEET 1.
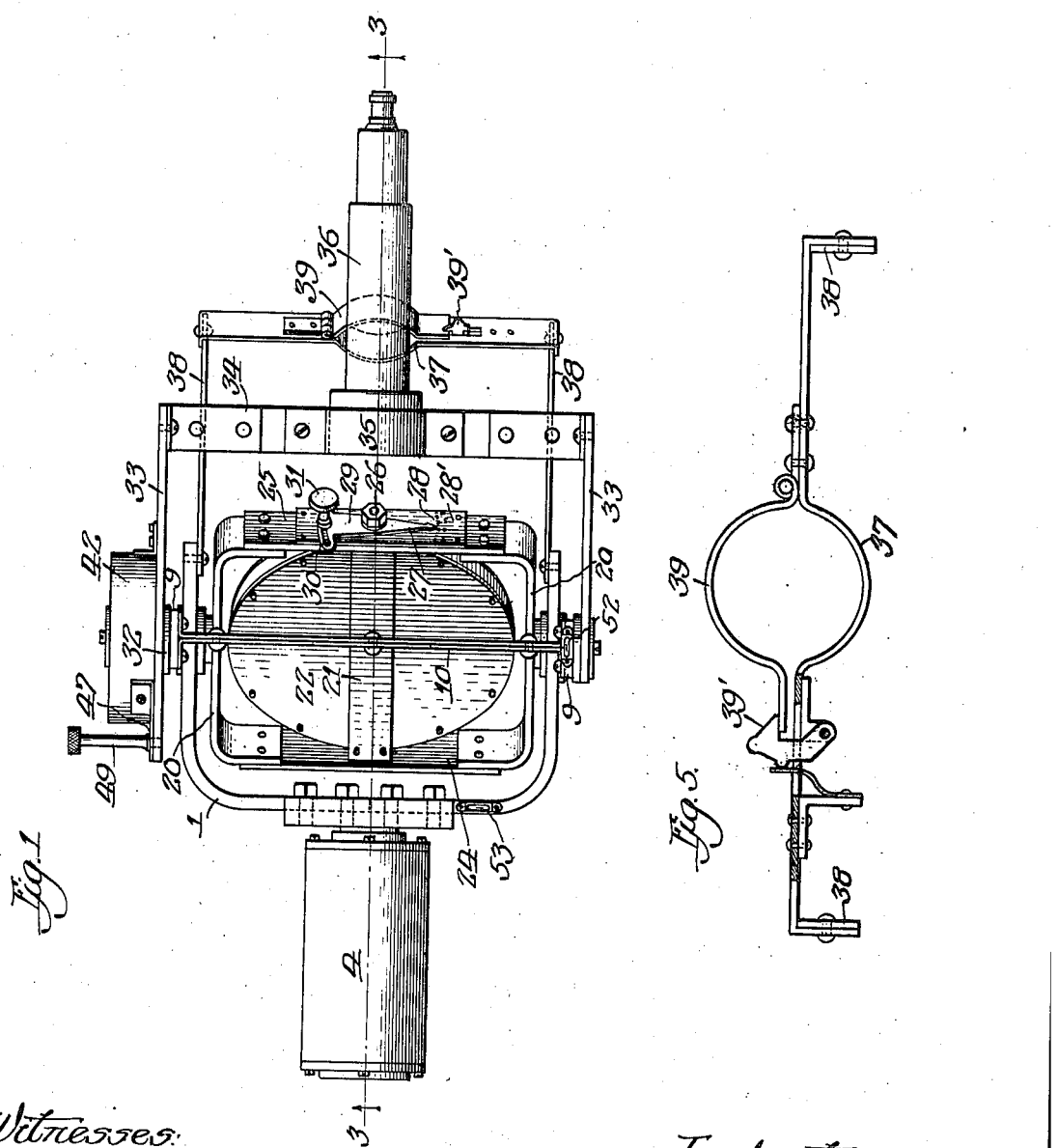
Witnesses:
Inventor
Ralph B. Head.
By Pond & Wilson
Attys.

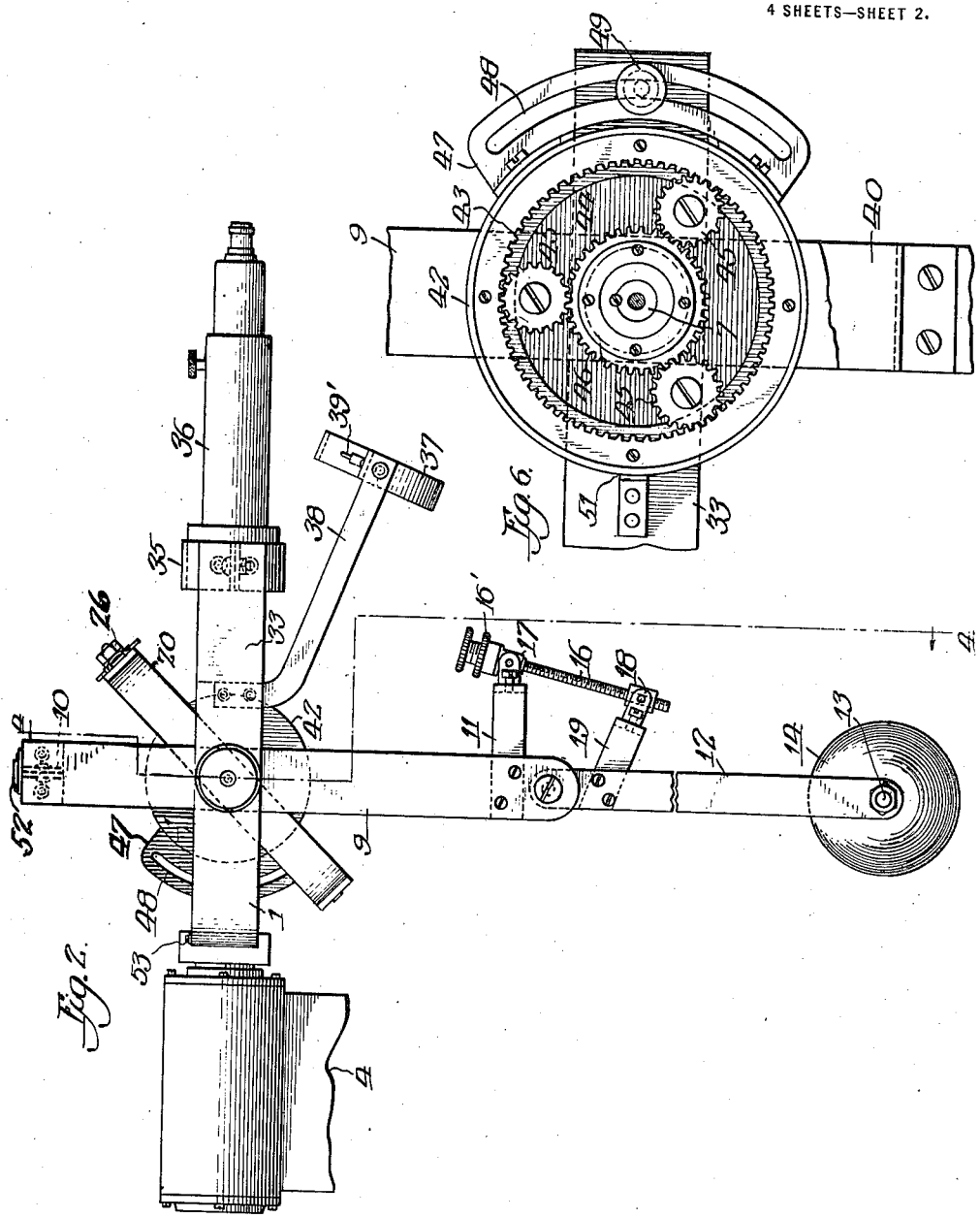

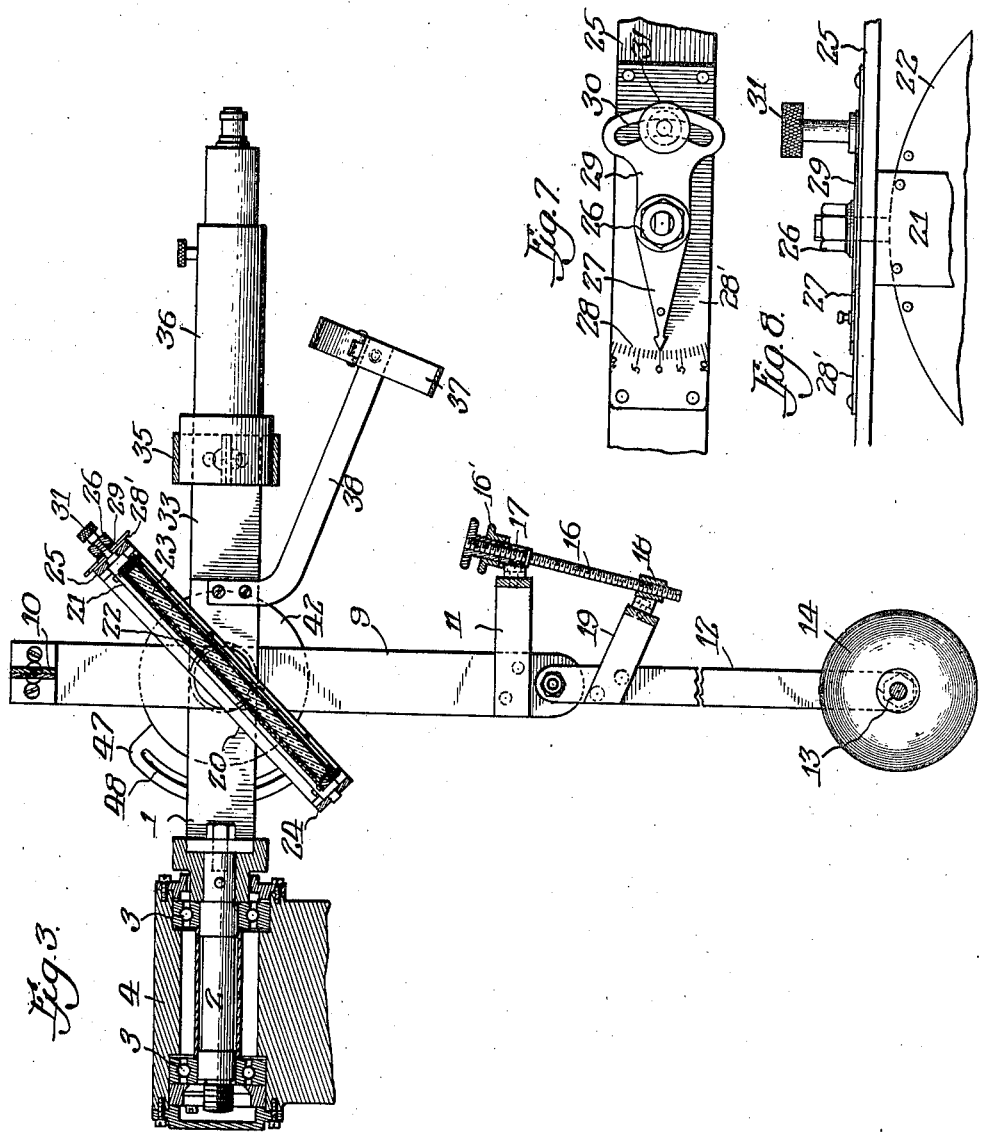

R. B. HEAD.
SIGHTING DEVICE FOR AEROPLANES.
APPLICATION FILED JUNE 19, 1918.
1,311,277.
Patented July 29, 1919.
4 SHEETS—SHEET 4.
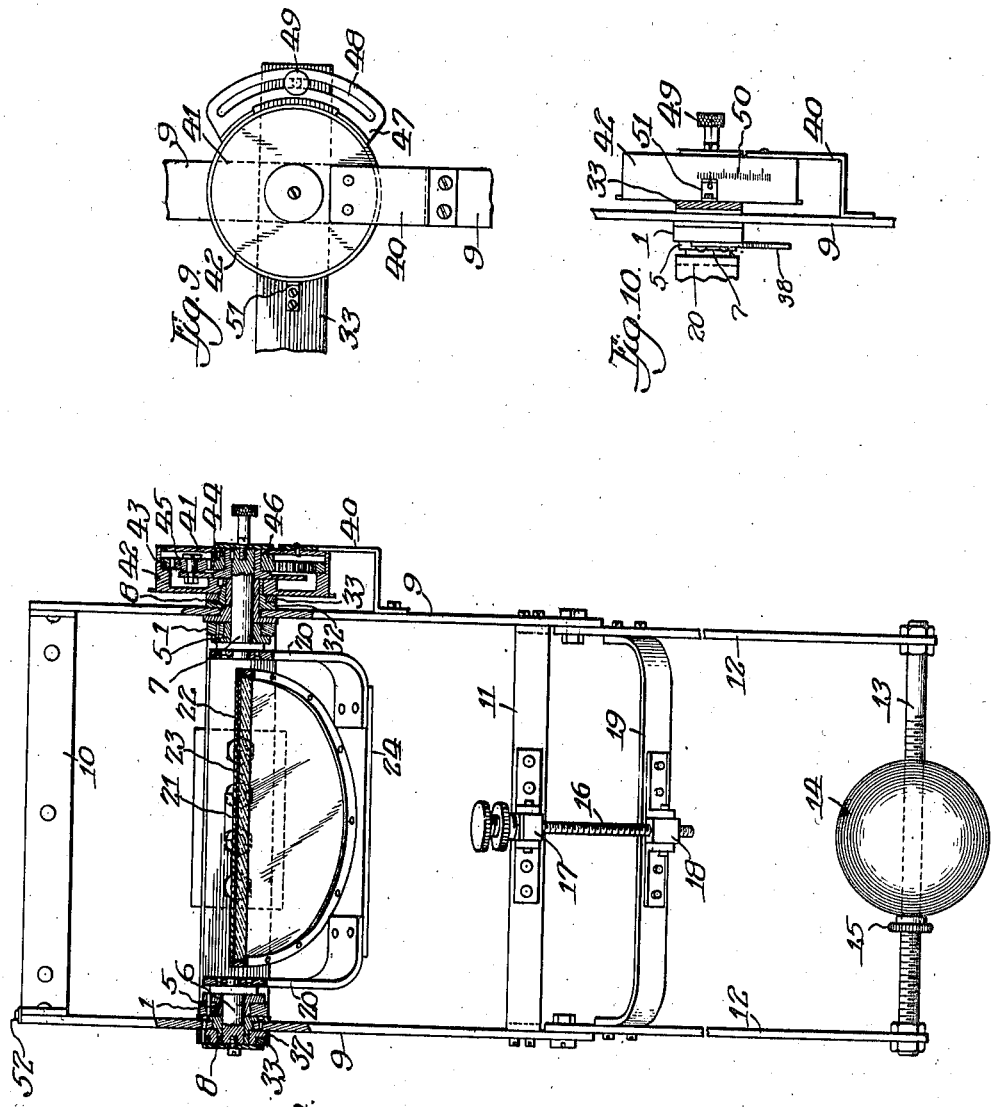

UNITED STATES PATENT OFFICE.

RALPH B. HEAD, OF MOMENCE, ILLINOIS.

SIGHTING DEVICE FOR AEROPLANES.

1,311,277.         Specification of Letters Patent.     Patented July 29, 1919.

Application filed June 19, 1918. Serial No. 240,723.

*To all whom it may concern:*

Be it known that I, RALPH B. HEAD, a citizen of the United States, residing at Momence, in the county of Kankakee and State of Illinois, have invented certain new and useful Improvements in Sighting Devices for Aeroplanes, of which the following is a specification.

This invention relates to sighting devices for aeroplanes and other forms of air craft which have for their general purpose to enable the pilot or observer of the craft to definitely determine the point in the flight at which to drop a bomb or other object in order that it may hit a desired target. It is well known that, due to its momentum, a body dropped from a rapidly moving aeroplane will land at a point much farther in advance of the base of the perpendicular from the aeroplane to the earth than would be the case if the aeroplane were moving more slowly. This distance also varies according to the height at which the aeroplane is traveling and to the wind. Aeroplanes are for the most part provided with devices showing the approximate speed and the approximate elevation, as well as the windage, if any; and under present practice, the dropping of bombs or other articles on targets is dependent mainly on the skill and judgment of the pilot or observer, based on and aided by these known data to determine the correct point in the flight at which to release the bomb, and necessarily involves a considerable element of guesswork. Sighting or observation devices involving the use of mirrors and field glasses designed to bring an image of the target to the eye of the observer have heretofore been proposed, but, so far as I am aware, such devices have proved to be too complicated or unreliable or both to be of much practical use, under the many and constantly varying conditions of service.

I have given to this problem long and profound study, and as a result I have evolved the device of the present invention which employs an angularly adjustable mirror and a field glass or telescope as its principal elements; and among the chief objects which I have had in view in the development and perfecting of the invention are; to provide an observation device wherein the angle of the mirror may be readily adjusted to bring into view through the telescope the image of an object perpendicularly beneath or at any known or predetermined striking distance in advance or to one side of a perpendicular from the aeroplane; to provide a device wherein the mirror, when adjusted to reflect through the telescope to the eye of the observer the image of an object on the ground a given distance in advance of a perpendicular from the aeroplane, will automatically maintain the line of vision of the observer while flying at a substantially constant altitude, regardless of fore and aft and sidewise oscillations of the aeroplane, and also regardless of the particular angle at which the telescope may be held by the observer while sighting; to provide a device wherein the disturbing effects of windage upon the sighting mechanism may be substantially neutralized and errors arising from that cause eliminated; to provide a device wherein the effect of lateral windage on the bomb or other projectile, after the same has been released, may be included in the calculations and properly discounted so as to avoid error on that score; to provide an observation device wherein the manual adjustments of the mirror and other parts shall all be within easy reach and control of the observer; and generally to provide a scientifically designed, practical and reliable sighting apparatus for air craft that shall be of substantial value and assistance to the aviator in performing the feat of accurately dropping bombs or other projectiles on targets under the numerous and constantly shifting conditions attending such work.

Other objects and advantages of the invention will be apparent to those skilled in the art from the following detailed description, taken in connection with the accompanying drawings in which I have illustrated one practical form in which the invention may be embodied, and wherein—

Figure 1 is a top plan view of the sighting device;

Fig. 2 is a side elevation of the same;

Fig. 3 is a vertical longitudinal section on the line 3—3 of Fig. 1;

Fig. 4 is a vertical transverse section on the line 4—4 of Fig. 2;

Fig. 5 is a detail view in front elevation, partly in section on an enlarged scale of a rest or support for the telescope when the latter is not in use;

Fig. 6 is a detail view in elevation enlarged of the gearing through which both the manual and automatic angular adjustments fore and aft of the mirror are effected;

Fig. 7 is a plan view and Fig. 8 is an elevation enlarged of a device, including a scale, for tilting the mirror endwise so as to correct the observer's vision of the target for lateral windage effects;

Fig. 9 is a detail elevation of the gear-box and adjusting means therefor shown in Fig. 6, including the pointer of the scale which indicates the amount of angular adjustment; and Fig. 10 is an edge view of Fig. 9 taken from the left of the latter figure, showing the scale and pointer.

Referring to the drawings, 1 designates a U-shaped frame, to the transverse member of which is secured a trunnion 2 that is rotatably mounted horizontally and preferably by ball-bearings 3 (Fig. 3) in a suitable standard 4 mounted on the air craft in front of the seat of the pilot or observer. In the side members of the frame 1 are secured bushings 5 in which are mounted a pair of shafts or trunnions 6 and 7. On the outwardly projecting portion of these trunnions are mounted, through bushings 8, the parallel side members 9 of a vertical frame, the upper ends of said side members 9 being rigidly connected by a cross-bar 10 and their lower ends being rigidly connected by a bail shaped bar 11. From the lower end of the vertical frame bars 9 is pivotally suspended a U-shaped frame comprising side bars 12 and a lower cross-bar 13 which is threaded, as shown in Fig. 4, and has mounted thereon a ball weight 14 that is clamped in adjusted position by a nut 15. The ball weight 14 is adjusted fore and aft of the plane of the longitudinal median lines of the vertical frame members 9 by means of an adjusting screw 16 rotatably mounted at its upper end in a swiveled collar or sleeve 17 carried by the frame member 11 and near its lower end engaging a nut 18 that is swiveled on a bail-shaped cross-bar 19 that connects the upper portions of the lower frame members 12; the screw 16 being provided with a locknut 16'. The purpose of this adjusting means for the weight 14 will appear later in the description of the operation of the device.

To and between the inner ends of the trunnions 6 and 7 are rigidly secured the opposite side members 20 of a mirror-carrying frame. Within this frame is mounted pivot shaft 21 (Fig. 3) to which is secured the frame or holder 22 of a mirror 23. The reduced ends of the pivot shaft 21 are journaled in bearings in the front and rear members 24 and 25 respectively of the mirror-carrying frame. On the upper trunnion or pivot of the mirror shaft 21 is secured by a clamp nut 26 a pointer 27 (Figs. 1, 7 and 8) that coöperates with a degree scale 28 marked on a plate 28' attached to the member 25 of the mirror-carrying frame. This pointer 27 has a rear extension 29 in which is formed an arcuate slot 30 through which passes the stem of a clamping nut 31, by which the mirror can be secured at any laterally adjusted angle as indicated by the scale 28.

Surrounding the bushings 8 are sleeves or bushings 32 on which are pivoted the side arms 33 of a bail shaped frame, the cross member 34 of which is formed centrally thereof with a clamp or holder 35 in which is mounted a telescope 36 of the type which shows a reversed image, and provided with the usual cross-hairs. The axis of the telescope is in the same vertical plane with the axis of the mirror and the axis of the frame supporting trunnion 2; and furthermore, the telescope is so mounted in relation to the mirror that its axis projected, strikes the center of the mirror in all positions of both telescope and mirror. The telescope when not in use lies in a rest or support 37, shown in detail in Fig. 5, that is carried by a pair of arms 38 rigidly secured to the free ends of the main frame 1, and the telescope may be fastened in such support by a hinged clamp 39, the free end of which is normally secured by a spring pressed latch 39'. By retracting the latch 39' and raising the clamp 39 the telescope may be readily swung upwardly to bring the eye-piece to the eye of the observer.

It is well known that aeroplanes in flight are almost constantly undergoing fore and aft and lateral oscillations continually varying in extent or amount. Such machines also carry devices showing the altitude and speed at any given time. The altitude, wind and speed being known, it is possible to calculate with fair accuracy the point at which a bomb should be dropped in order to hit a target toward which the machine is flying. In order to bring an image of the target to the vision of the observer at the proper instant for dropping the projectile, the mirror must be adjusted to the proper angle which is determined from calculations of the altitude, wind and speed. For this purpose I have provided a manual adjustment of the mirror angle fore and aft, the adjusting means being dependent upon the vertical position of the frame 9 from which is suspended the weight 14. This adjusting mechanism is shown principally in Figs. 4, 6, 9 and 10, and comprises the following parts. To one of the side frame members 9 is secured an offset bracket arm 40, to the upper end of which in turn is secured the outer cover plate 41 of a gear drum or housing 42, it being understood that the body of the gear housing 42 is capable of rotation independently of the stationary cover plate 41. The member 42 is rotatably mounted on one of the bearing sleeves 32 that surrounds the trunnion 7 and it carries an internal gear 43, as best shown in Fig. 6. Keyed on the outer end of the trunnion 7 is a spider 44 on which are rotatably journaled a series of planet gears 45. These planet gears mesh with the internal gear 43 and also with a stationary gear 46 that is secured to the stationary cover plate 41. Secured to the periphery of the gear casing 42 is a segment plate 47 in which is formed an arcuate slot 48, through which passes a clamping nut 49, by which the segment plate may be secured in any adjusted position to one of the arms 33 of the telescope carrying frame. On the periphery of the gear casing 42 opposite the segment plate 47 and on the side toward the observer is a scale 50 with which coöperates a pointer 51 secured to the arm 33, as best shown in Fig. 10.

By the last described mechanism the operator, by turning the gear casing 42 in one direction or the other to an extent indicated by the scale 50, shifts the mirror fore and aft to the correct angle for reflecting through the telescope to the eye of the observer the image of a target at predetermined or known distance in advance of a perpendicular from the aeroplane, as ascertained by the known elevation and speed of travel. Hence, the mirror having been adjusted to this angle, as soon as the image of the target is crossed by the cross-hairs of the telescope the operator releases the projectile. Now, since the angles of incidence and reflection are always equal, and since the planetary gearing above described automatically shifts the fore and aft angle of the mirror in the same direction that the telescope is shifted either by the fore and aft oscillations of the aeroplane or by the up and down movements of the telescope in the hand of the operator, and always to one-half the extent, it will be seen that, the mirror having once been adjusted for a given position of the target, the time at which the target will be seen through the telescope is independent of and unaffected by such fore and aft oscillations.

This result might, however, be affected by wind pressure acting in direct opposition to the forward flight of the machine upon the weight 14 and its supporting frame. This may be neutralized by shifting the weight 14 by means of the adjusting screw 16, more or less rearwardly of the vertical plane of its axis of suspension, whereby the frame bars 9 may be kept vertical. In making this adjustment in the face of any given wind pressure, the vertical position of the frame bars 9 may be ascertained by a spirit level 52 (Fig. 1) mounted on the upper end of one of the frame bars 9.

It will further be noted that the weight 14, being suspended at points on opposite sides of the axis of the trunnion 2 may be adjusted on its supporting rod 13 so as to maintain the main supporting frame 1 level in the sidewise direction, thereby preventing the mirror from tilting sidewise during lateral oscillations of the machine. To determine the sidewise level position of the frame 1, it is provided with a spirit level 53 (Fig. 1).

Lateral windage of course affects the flight of the projectile after it has been dropped, and, in order to secure a reasonable degree of accuracy, this must be discounted before the projectile is dropped. For strong lateral windage the mirror should be tilted to the right or left as necessary; thus, with a strong right wind that side of the mirror toward the wind should be tilted downwardly, thereby shifting the angle of sight toward the left to neutralize the effect of the wind on the dropping projectile; and conversely with a strong left wind. This right and left tilting of the mirror is effected by adjustment of the pointer 27 to the extent indicated by the scale 28, the amount of adjustment being determined by the windage indicator ordinarily carried by aeroplanes.

From the foregoing it will be apparent that in the device of the present invention I have provided a sighting apparatus for aeroplanes which, in coöperation with the speed, altitude and wind indicating devices ordinarily carried by such machines, will enable the pilot or observer to determine the proper instant at which to release a projectile with a reasonable certainty of hitting the target, notwithstanding the numerous and constantly varying conditions which attend the flight of the machine. The adjustments are such as may be readily made by the operator from his seat of observation; and when the apparatus has been properly set or adjusted for a given altitude, a given speed and a known wind pressure, it automatically takes care of the fore and aft and lateral oscillation vibrations which the machine is continuously undergoing to a greater or less extent.

While I have shown and described the present invention as adapted for use on air craft, it is manifest that with slight detail modifications it is adaptable for other uses, such as a sighting device for anti-air craft guns. Hence, the invention is not to be considered as limited to any particular application or use thereof.

It will be manifest to those skilled in the art that the mechanism herein shown and described as representing a typical embodiment of the invention may be variously modified in respect to details without involving any departure from the principles involved or sacrificing any of the advantages attained. Hence, I reserve all such variations and modifications as fall within the spirit and purview of the appended claims.

I claim:

1. In a sighting device for air craft, in combination, a plurality of members mounted to have relative movement about a common axis, one of said members being provided with means adapting it to constantly occupy a true perpendicular position, another of said members carrying a telescope, and the other of said members carrying a mirror disposed at an angle to the axis of said telescope and adapted to reflect into the telescope an image of an object beneath said mirror, and means connecting said members whereby angular movement of said telescope-carrying member about said axis effects an angular movement of less extent of said mirror-carrying member in the same direction.

2. In a sighting device for air craft, in combination, a plurality of members mounted to have relative movement about a common axis, one of said members being provided with means adapting it to constantly occupy a true perpendicular position, another of said members carrying a telescope, and the other of said members carrying a mirror disposed at an angle to the axis of said telescope and adapted to reflect into the telescope an image of an object beneath said mirror, and planetary gearing connecting said members whereby angular movement of said telescope-carrying member about said axis effects an angular movement of less extent of said mirror-carrying member in the same direction.

3. In a sighting device for air craft, in combination, a plurality of members mounted to have relative movement about a common axis, one of said members carrying a weight adapting it to constantly occupy a true perpendicular position, another of said members carrying a telescope, and the other of said members carrying a mirror disposed at an angle to the axis of said telescope and adapting it to reflect into the telescope the image of an object beneath said mirror, a central gear fast with said weight-carrying member, an internal gear fast with said telescope-carrying member, and planetary gears fast with said mirror-carrying member.

4. In a sighting device for air craft, in combination, a plurality of members mounted to have relative movement about a common axis, one of said members carrying a weight adapting it to constantly occupy a true perpendicular position, another of said members carrying a telescope, and the other of said members carrying a mirror disposed at an angle to the axis of said telescope and adapting it to reflect into the telescope the image of an object beneath said mirror, a central gear fast with said weight-carrying member, an internal gear fast with said telescope-carrying member, planetary gears fast with said mirror-carrying member, and manually operable means for adjusting the angular position of said internal gear relatively to said telescope-carrying member.

5. In a sighting device for air craft, in combination, a main frame swiveled on a horizontal axis lying in a direction fore and aft of the craft and having sides parallel with and on opposite sides of swivel axis, a mirror-supporting frame having trunnions journaled in the sides of said main frame, a mirror mounted in said mirror-supporting frame, a telescope-supporting frame pivoted on said trunnions, a telescope carried by said telescope-supporting frame, a weighted frame suspended from said trunnions, and gearing intermediate the latter frame and said mirror and telescope-supporting frames whereby angular movement of either of said mirror and telescope-supporting frames about the axis of said trunnions effects angular movement of the other in the same direction and of different extent.

6. In a sighting device for air craft, in combination, a main frame swiveled on a horizontal axis lying in a direction fore and aft of the craft and having sides parallel with and on opposite sides of said swivel axis, a mirror-supporting frame having trunnions journaled in the sides of said main frame, a mirror mounted in said mirror-supporting frame, a telescope-supporting frame pivoted on said trunnions, a telescope carried by said telescope-supporting frame, a weighted frame suspended from said trunnions, planetary gearing intermediate the latter frame and said mirror and telescope-supporting frames, and manually operable means for adjusting an element of said planetary gearing relatively to its support whereby to shift the angle between the plane of the mirror and the axis of said telescope.

7. In a sighting device for air craft, in combination, a main frame swiveled on a horizontal axis lying in a direction fore and aft of the craft and having sides parallel with and on opposite sides of said swivel axis, a mirror-supporting frame having trunnions journaled in the sides of said main frame, a mirror mounted in said mirror-supporting frame, a telescope-supporting frame pivoted on said trunnions, a telescope carried by said telescope-supporting frame, a weighted frame suspended from said trunnions, a central gear fast with said weighted frame, an internal gear fast with said telescope-supporting frame, planetary gears fast with said mirror-supporting frame, and manually operable means for adjusting the angular position of said internal gear relative to said telescope-supporting frame.

8. In a sighting device for air craft, in combination, a main frame swiveled on a horizontal axis lying in a direction fore and aft of the craft and having sides parallel with and on opposite sides of said swivel axis, a mirror-supporting frame having trunnions journaled in the sides of said main frame, a mirror swiveled in said mirror-supporting frame on an axis at right angles to the axis of said trunnions, a telescope-supporting frame pivoted on said trunnions, a telescope carried by said telescope-supporting frame, a weighted frame suspended from said trunnions, and gearing intermediate the latter frame and said mirror and telescope-supporting frames whereby angular movement of either of said mirror and telescope-supporting frames about the axis of said trunnions effects angular movement of the other in the same direction and of different extent.

9. In a sighting device for air craft, in combination, three coaxially mounted frames, one of said frames carrying a telescope, another carrying a mirror disposed at an angle to the axis of the telescope and the third carrying a weight below its axis of suspension, gearing connecting said frames for relative movement about their common axis, and means for adjusting said weight to one side or the other of a perpendicular plane passing through said axis of suspension.

10. In a sighting device for air craft, in combination, a main frame swiveled on a horizontal axis lying in a direction fore and aft of the craft, three frames supported on said main frame and mounted on a common axis lying at right angles to the swivel axis of said main frame, one of said three frames carrying a telescope, another carrying a mirror disposed at an angle to the axis of the telescope, and the third carrying a weight below its axis of suspension, gearing connecting said frames for relative movement about their common axis, means for adjusting said weight to one side or the other of a perpendicular plane passing through said axis of suspension, and means for adjusting said weight lengthwise of said axis of suspension.

11. In a sighting device for air craft, in combination, a main frame swiveled on a horizontal axis lying in a direction fore and aft of the craft and having sides parallel with and on opposite sides of said swivel axis, a mirror-supporting frame having trunnions journaled in the sides of said main frame, a mirror swiveled in said mirror-supporting frame on an axis at right angles to the axis of said trunnions, manually operable means including a scale and pointer for adjusting said mirror on its swivel axis and securing it in adjusted position, a telescope-supporting frame pivoted on said trunnions, a telescope carried by said telescope-supporting frame, a weighted frame suspended from said trunnions, gearing intermediate the latter frame and said mirror and telescope-supporting frames adapting said frames for relative angular movement about the axis of said trunnions, and manually operable means including a scale and pointer for adjusting an element of said gearing relatively to its support whereby to shift the angle between the plane of the mirror and the axis of said telescope.

12. In a sighting device for air craft, in combination, a main frame swiveled on a fore and aft axis and having side members disposed on opposite sides of said axis, a mirror-carrying frame pivoted between the sides of said main frame, a telescope-carrying frame pivoted to the sides of said main frame, and a weighted frame suspended from the sides of said main frame and acting to prevent lateral oscillation of said main frame during lateral oscillation of said air craft.

13. In a sighting device for air craft, in combination, a main frame swiveled on a fore and aft axis and having side members disposed on opposite sides of said axis, a mirror-supporting frame pivoted between the sides of said main frame, a mirror swiveled in said mirror-supporting frame on an axis at right angles to the axis of the latter, means for adjusting said mirror angularly sidewise and securing it in adjusted position, a telescope-carrying frame pivoted to the sides of said main frame, and a weighted frame suspended from the sides of said main frame and acting to prevent lateral oscillation of said main frame during lateral oscillation of said air craft.

14. In a sighting device for air craft, in combination, a main frame swiveled on a fore and aft axis and having side members disposed on opposite sides of said axis, a mirror-carrying frame pivoted between the sides of said main frame, a telescope-carrying frame pivoted to the sides of said main frame on an axis coincident with the axis of said mirror-carrying frame, a vertical frame suspended from the sides of said main frame, a weight mounted on said vertical frame below its axis of suspension, and means for adjusting the position of said weight lengthwise of said axis of suspension.

15. In a sighting device for air craft, in combination, a pivoted telescope-supporting frame, a telescope mounted on said frame, a mirror mounted in advance of said telescope in a position to reflect into the latter the image of an underlying object, and a holder to support said telescope and its supporting frame in a fixed position when not in use.

16. In a sighting device for air craft, in combination, a main frame, a telescope-supporting frame pivoted to said main frame with capacity for up and down swinging movement, a telescope mounted on said supporting frame, and a mirror mounted on said main frame in advance of said telescope and angularly adjustable both up and down and sidewise relatively to said main frame.

17. In a sighting device for air craft, in combination, a main frame, a telescope-supporting frame pivoted to said main frame with capacity for up and down swinging movement, a telescope mounted on said supporting frame, a mirror mounted on said main frame in advance of said telescope and angularly adjustable both up and down and sidewise relatively to said main frame, and a holder secured to said main frame and serving to support said telescope and its supporting frame in a fixed position when not in use.

RALPH B. HEAD.